INVENTORS
ARTHUR E. VOGEL
PALMER FULTZ
Schmieding and Fultz
ATTORNEYS

INVENTORS
ARTHUR E. VOGEL
PALMER FULTZ
Schmieding and Fultz
ATTORNEYS

United States Patent Office 3,480,293
Patented Nov. 25, 1969

3,480,293
CONTROL SYSTEM FOR VEHICLE SUSPENSIONS
Arthur E. Vogel, 1860 E. Cherry St. 43205, and
Palmer Fultz, 3832 Riverside Drive 43220, both
of Columbus, Ohio
Filed Sept. 15, 1966, Ser. No. 579,707
Int. Cl. B60g *17/04, 17/06*
U.S. Cl. 280—124 18 Claims

ABSTRACT OF THE DISCLOSURE

A control system for vehicle suspensions of the type that include sprung and unsprung weight portions, air chambers operative between the weight portions and an air compressor for delivering pressurized air to said chambers. The system is further characterized by the compressor being stallable at predetermined pressure selected for the air chambers by a height control valve means mounted on one of said weight portions and provided with a pivoted valve actuating arm mounted on the other of said weight portions.

---

Figure 1:
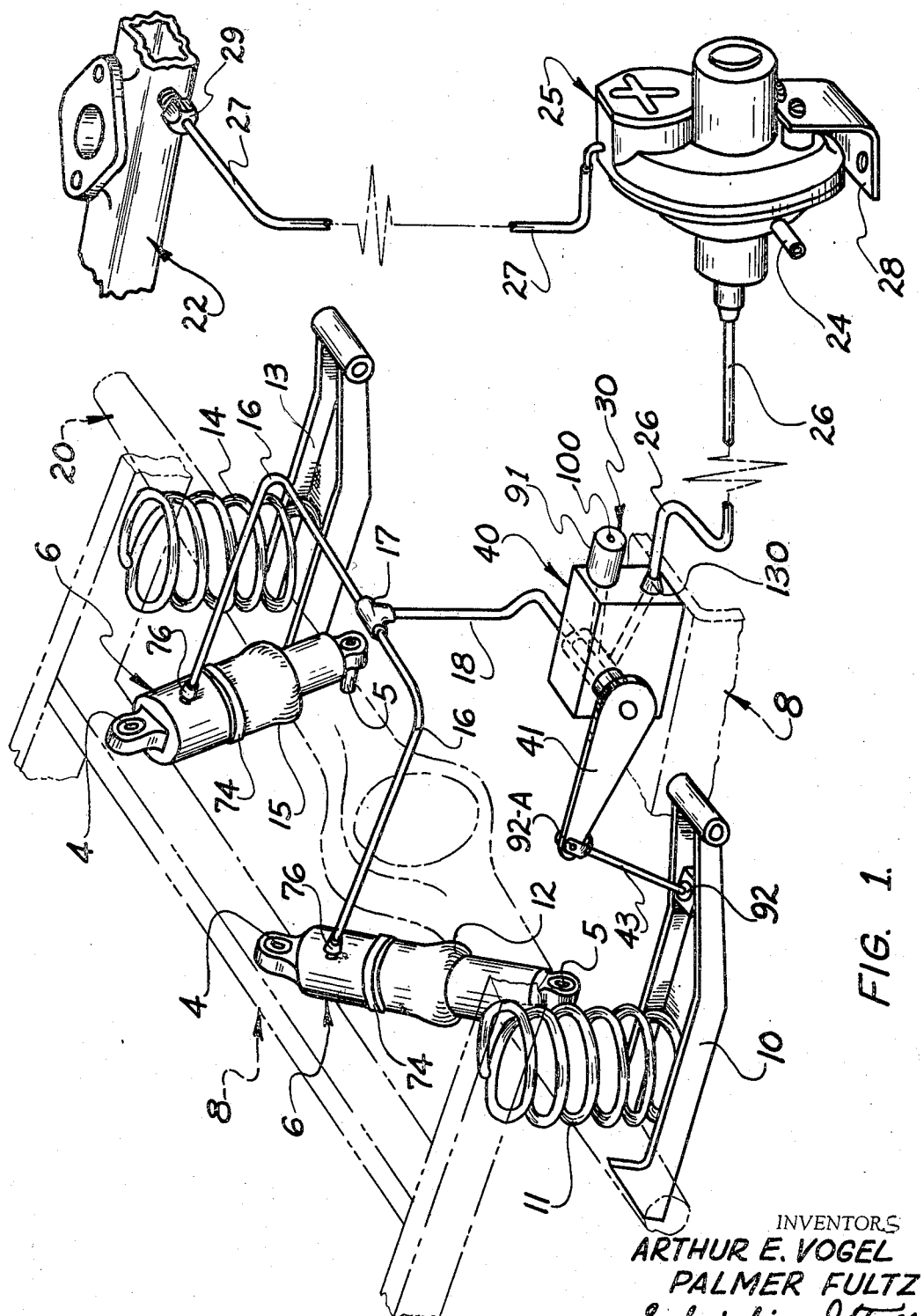

This invention relates to control systems for vehicle suspensions of the type that include air spring chambers for supporting at least a portion of the sprung weight of the vehicle.

In general, the present invention relates to novel method and apparatus wherein an air compressor is used to supply pressurized air for controlling the height of a vehicle suspension. The air compressor is of a type which is driven by a resilient force such as a flow of atmospheric air to the intake manifold of the engine that powers the vehicle and, in accordance with the present invention, a predetermined maximum static pressure is automatically established in the air chamber means of the suspension system by stalling the air compressor, against the pressure of said flow of atmospheric air that drives it, by an increase in back pressure at the compressor outlet.

The air compressor is also automatically released from its stalled state responsive to the pressure in the air chamber means when such pressure is less than the stalling pressure of the compressor. This causes a decrease in back pressure at the compressor outlet whereby the air compressor is automatically started to supply a pressure increase in the air chamber means as is required to effect height control of the vehicle under increased static loading.

In accordance with one aspect of the present invention the above mentioned maximum static pressure in the air chamber means is established in a novel manner so as to be equal to the designed pressure at which the air chamber means can be safely operated without structural failure with the result that the air chamber means are always protected against over-pressurization. This is accomplished by directly controlling an air compressor means that pressurizes the system by incorporating in the compressor a predetermined area relationship between the driving piston and the driven piston. As a result, the pressure of the outlet flow of air from the compressor can never during cruise and idle operating conditions be greater than said maximum static pressure value.

More specifically, it has been determined that such predetermined maximum static pressure in the air chamber means will never be exceeded during cruise and idle operating conditions if the area relationship between the driven and driving piston means of the air compressor is established in accordance with an equation which will be referred to herein as the "Direct Regulation Equation" as follows:

$$P_{MAX} = \frac{A_1}{A_2}(P_{AA} - P_{MA})$$

where:

$P_{MAX}$ = The predetermined maximum static pressure in the air chamber means
$A_1$ = Area of the driving piston means of the compressor
$A_2$ = Area of the driven piston means of the compressor
$P_{AA}$ = Average atmospheric pressure
$P_{MA}$ = Average pressure in the engine manifold at normal cruising and idling speeds The air compressor is also stalled at various air spring chamber pressures, below said predetermined maximum, by height control valve means for the flow of pressurized air from the compressor to the air spring chambers. Such valve means is operated responsive to a predetermined normal configuration height differential between the sprung and unsprung weights of the vehicle. This arrangement effects automatic direct "on-off" control of the compressor running cycle as is required to make height corrections under variations in static loading and thereby maintain said predetermined normal height differential between the sprung and unsprung weights of the vehicle.

As another function of said height control means it is adapted to operate during actual operation of the vehicle responsive to road imposed oscillations and effect controlled direct "on-off" cycling of the compressor as well as the controlled exhausting of air from the air chamber means under actual dynamic operating conditions.

Such controlled dynamic operation of the present system is effected in accordance with the present invention by a novel time delay exhaust restrictor means that is "tuned" with respect to the above mentioned dynamic operation of the height control valve means such that the exhaust flow rate from the time delay exhaust restrictor means is proportional with respect to the flow rate through the height control valve means. Such controlled exhaust rate is established by the size of said time delay exhaust restrictor means such that road imposed oscillations of the height control valve means for minute time intervals can never exhaust air from the system at a flow rate greater than the flow rate admitted by oscillatory action of the height control valve means.

This prevents an undesirable "pumping down" of the air chamber means under sustained road imposed oscillations and eliminates the need for a manual shut-off valve for the exhaust flow from the height control valve means.

At the same time the size of the restrictor means must be large enough to provide a sufficient exhaust flow rate to prevent undesirable "pumping up" of the air chamber means during oscillatory conditions. It therefore follows that the size of restrictor means is tuned to establish an exhaust flow rate substantially equal to the flow rate through height control valve means during oscillatory conditions.

As another aspect of the present invention the novel time delay restrictor means and its tuned operation with respect to the height control valve means completely eliminate the need for a manual shut-off valve for the exhaust flow from the system of the type utilized in United States Letters Patent 3,173,671 to Broadwell dated Mar. 16, 1965.

As still another aspect of the present invention the above mentioned height control valve means includes a novel O-ring minimum pressure valve that functions with high accuracy to prevent the pressure in the air chamber means from ever falling below a predetermined minimum pressure valve. This prevents collapsing of the air chamber means and resulting and chaffing and wear of the chamber walls.

It is therefore an object of the present invention to provide a novel air compressor type method and apparatus for controlling a vehicle suspension system wherein a maximum predetermined static pressure in the air chamber means of the system is established in a novel manner so as to be equal to a designed maximum operates pressure for the system. This is accomplished by incorporating in the air compressor a predetermined area relationship between the driving piston and the driven piston such that the air compressor is stalled against the pressure of the flow of atmospheric air that drives it when the pressure in said air chamber means reaches said designed maximum operating pressure.

It is another object of the present invention to provide a controlled vehicle suspension system which during dynamic operation of the vehicle automatically controls the inlet and exhaust flow rates to and from the system and thereby prevents any undesirable "pumping down" or "pumping up" of the air chamber means under sustained road imposed oscillations.

It is another object of the present invention to provide a controlled vehicle suspension system which comprises an O-ring minimum pressure valve that functions with high accuracy to prevent the pressure in the air chamber means from ever falling below a predetermined minimum pressure valve. This prevents collapsing of the air chamber means and resulting chaffing and wear of the chamber walls.

Another object of the present invention is to provide a control system for vehicle suspensions that comprises a novel combination of resiliently driven air compressor, associated height control valve and time delay exhaust restrictor means that cooperate to eliminate the need for a high pressure air reservoir as well as pressure regulating mechanism for controlling the pressure therein.

Another object of the present invention is to provide a novel control system for vehicle suspensions that incorporates mechanism of extreme simplicity that is highly economical to manufacture and maintain.

Further objects and advantages of the present invention will be apparent from the following description, reference being had to the accompanying drawings wherein a preferred form of embodiment of the invention is clearly shown.

Figure 2:
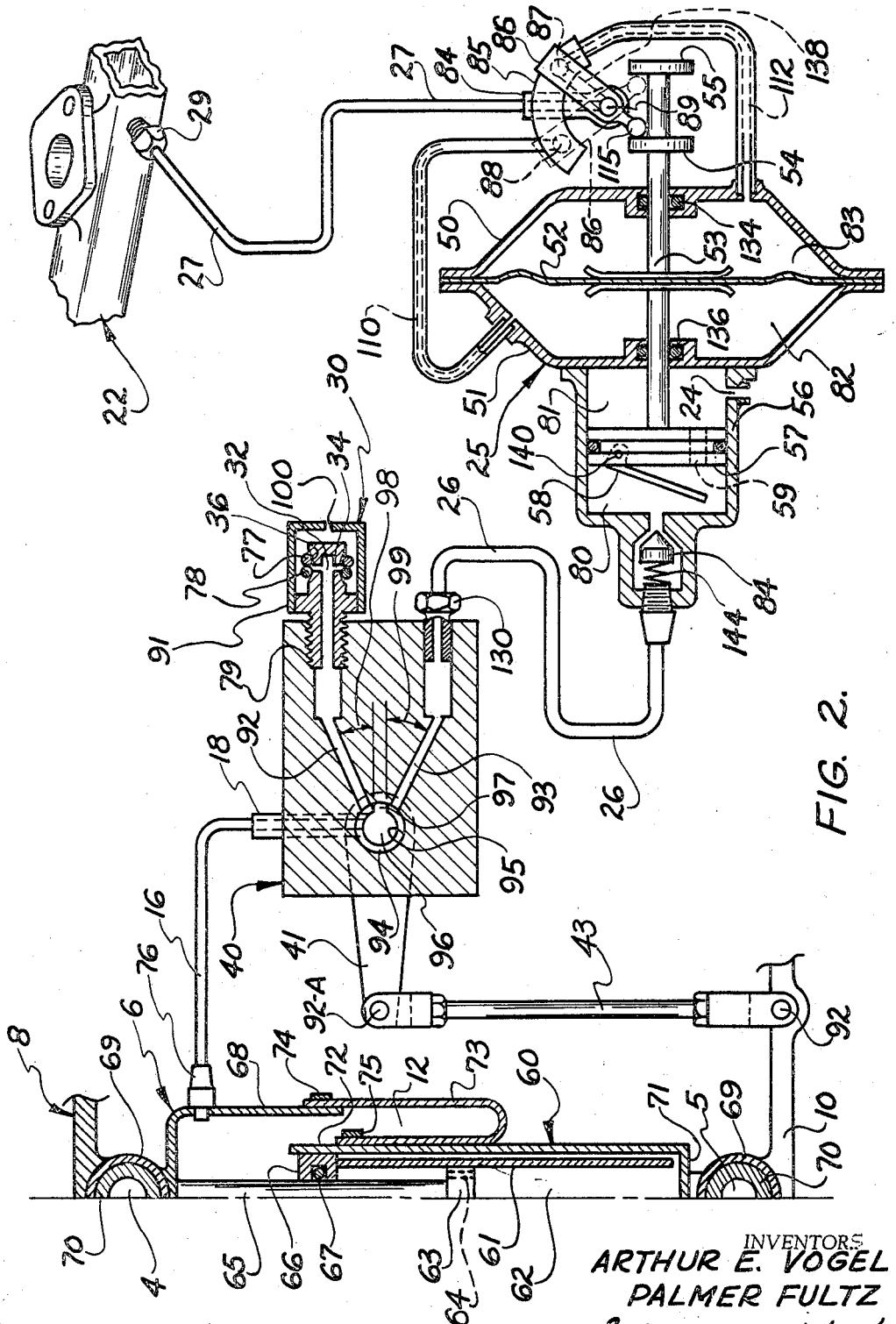

In the drawings:

FIG. 1 is a perspective view of a control system for vehicle suspensions constructed in accordance with the present invention; and FIG. 2 is a diagrammatic view of the suspension system of FIG. 1 which shows, in section, the interiors of the components of the system.

Referring in detail to the drawings, FIG. 1 illustrates a control system for a vehicle suspension constructed in accordance with the present invention which includes a sprung weight portion indicated generally at 8, and unsprung weight portions 10 and 13.

The sprung weight 8 includes a conventional vehicle frame, only partially illustrated here for clarity, that is supported by coil springs 11 and 14 mounted on the rear of the vehicle, it being understood that the front of the vehicle is also supported on similar springs in the conventional manner.

The sprung weight 8 is partially supported by a plurality of air biased shock absorber apparatus indicated generally at 6 each of which includes an upper pivot mounting pin 4 and a lower pivot mounting pin 5. Shock absorber units 6 also include air chamber means 12 and 15 which function as air spring chambers and are preferably formed by flexible bags of synthetic rubber or the like that support the load in parallel with the coil springs 11 and 14.

The unsprung weight further includes a conventional rear axle and universal assembly shown in phantom and indicated generally at 20 in FIG. 1.

With continued reference to FIG. 1, a height control valve indicated generally at 40 is mounted on the sprung weight 8 and includes an actuating arm 41 and rod 43 having a lower pivotal connection with one of the unsprung weight portions 10 at a pivot pin 92. A pivotal connection between arm 41 and rod 43 is formed by a second pivot pin 92-A.

It should be pointed out that in certain installations valve actuating arm 41 or rod 43 can be provided with a suspension override means, not illustrated to prevent excessive movement and possible damage of the valve mechanism during high amplitude oscillations of the suspension. For example, arm 40 or rod 43 can in various ways be adapted for resilient flexing to provide such override means.

Height control valve 40 receives pressurized air from an air compressor indicated generally at 25 via line 26 which communicates with an intake fitting 130 mounted on the valve.

The interior of each of the air spring chambers 12 and 15 communicates with valve 40 via line 18, T-connection 17, and line 16.

Referring next to FIG. 2, compressor 25 includes a smaller cylinder 56 provided with a driven piston 57 that is reciprocated by a larger driving piston or flexible diaphragm 52, said pistons being rigidly connected by a rod 53 slideably mounted in the sealed bores 134 and 136 formed in the walls of compressor housing portions 50 and 51.

Driving piston 52 is reciprocated by alternate pressurization of two separate air chambers 82 and 83 which are respectively connected to ports 88 and 87 of a compressor timing valve via the lines 110 and 112. For purposes of clarity of illustration said timing valve mechanism is diagrammatically illustrated in FIG. 2 and includes a center port 89 which is always in communication via line 27 with a source of vacuum preferably provided by the intake manifold of the vehicle engine, said manifold being indicated generally at 22.

The compressor timing valve mechanism further includes a pivotally mounted arm 86 that is provided with a longitudinal passage 138 and such arm is reciprocated between the position shown in solid delineation and the position shown in dotted delineation by two valve actuating shoulders 54 and 55 which are rigidly mounted on the rear end of piston driving rod 53.

It will now be understood that when valve arm 86 is in the position shown by solid delineation passage 138 in the arm connects one chamber 83 of compressor 25 with intake manifold 22 via line 112, port 87, passage 138, port 89, line 27, and fitting 29 mounted on manifold 22. Similarly when arm 86 is in the position shown by dotted delineation then passage 138 connects the other chamber 82 with intake manifold 22 via a line 110, port 88, passage 138 in arm 86, port 89, line 27, and fitting 29.

It should also be pointed out that when valve arm 86 is at port 87 the other port 88 is open to atmospheric air and vice versa.

It will now be understood that when chamber 82 and 83 are alternately evacuated, atmospheric air enters a respective one of the valve ports 88 or 87 and drives diaphragm 52 towards the evacuated one of the chambers. As the diaphragm 52 moves it will carry along piston driving rod 53 and flip timing valve arm 86 wherein the other one of the chambers 82 or 83 is evacuated to drive diaphragm 52 in the opposite direction.

With continued reference to FIG. 2, and particularly to the smaller driven piston 57, it will be understood that when the piston is moved to the right by diaphragm 52 and drive rod 53, cylinder 80 is charged via intake line 24, chamber 81, passage 59, and flapper valve 58, said valve being mounted on piston 140 so as to be openable by the pressure of the entering air.

When piston 57 is driven to the left, FIG. 2, flapper valve 58 is closed by air pressure whereby the piston pressurizes cylinder 80 and forces open valve 84 normally biased against its seat by a valve spring 144. This delivers air through line 20 and fitting 30 to height control valve 40.

The height control shock absorber apparatus 6 of FIG. 2 includes a shock absorber means or equivalent device indicated generally at 60 and connected between sprung and unsprung weight portions 8 and 10. An identical shock absorber apparatus 6 is connected between sprung and unsprung weight portions 8 and 13.

Shock absorber means 60 includes a cylindrical shock absorber wall 61 that forms a chamber 62. A piston 63 is mounted for reciprocation in the chamber and includes a restrictor 64, shown as an orifice, for the restricted passage of fluid from one side of piston 63 to the other side of the piston upon reciprocation of the piston in the cylinder.

Shock absorber means 60 further includes a piston rod 65 extended through a closure 66 provided with a fluid seal 67. The upper end of piston rod 65 is rigidly attached to the top of a control chamber wall 68 and also to a mounting ring 69.

A resilient bushing 70, formed of synthetic rubber or the like is disposed in mounting ring 69 and surrounds mounting pin 4 that forms a portion of the sprung weight 8. Hence it will be understood that shock absorber piston 63, rod 65, and control chamber wall 68 are mounted stationary with respect to sprung weight portion 8.

A lower end wall 71 of shock absorber means 60 is mounted to a respective unsprung weight portion 10 or 13 by a second mounting ring 69 that surrounds a second resilient bushing 70 and mounting pin 5. Hence it will be understood that shock absorber cylinder wall 61 moves with its respective unsprung weight portion 10 or 13 and reciprocates with respect to shock absorber piston 63.

Chamber 62 of the shock absorber means 60 contains a suitable conventional shock absorber fluid such as oil and provides a viscous damping upon reciprocation of piston 63.

The previously mentioned air spring chamber 12 is operatively connected between sprung weight portions 8 and shock absorber means 60 and is formed by the previously mentioned chamber wall 68, shock absorber wall 72, closure 66, and a flexible third wall 73.

Flexible wall 73 is formed of flexible material, such as synthetic rubber or the like, and includes an outer end secured and sealed to the lower end of chamber wall 68 by a clamp ring 74. An inner end of flexible wall 73 is secured in sealed relationship to the previously mentioned shock absorber wall 72 by a clamp ring 75.

The generally U-shaped cross section of flexible wall 73 permits it to extend and retract along shock absorber wall 72 upon variations in pressure in air chamber 12 and upon reciprocation of the suspension system during travel of the vehicle.

Chamber 12 further includes an inlet fitting 76 to which is connected the previously mentioned line 16 leading to control valve 40.

As seen in FIG. 2, control valve 40 includes a bore 95 in which is rotatably mounted a rotary valve element 94 provided with a central bore 96 that connects line 16 to a valve port 97 that is in turn selectively connectable to either an intake valve passage 93 or an exhaust valve passage 92.

The previously mentioned valve actuating arm 41 includes an inner end mounted on an outer end of rotary valve element 94 whereby movement of the sprung weight 8 rotates rotary valve element 97.

Upon lowering of sprung weight 8, valve port 97 is rotated into alignment with intake valve passage 93. This connects air chambers 12 and 15 of the two air biased shock absorber apparatus 6 with air compressors 25 and the compressor is thereby released from its stalled, stationary state and is caused to pump air from smaller cylinder 80 to air chambers 12 and 15 until the sprung weight 8 is raised back up to the normal configuration datum position at which position valve port 97 has moved out of communication with intake valve passage 93 and into the centered valve position of FIG. 2.

It is important to note that when valve port 97 is centered the intake valve passage 93 is closed thereby causing stalling of compressor 25 against the atmospheric pressure exerted on compressor diaphragm 52.

When sprung weight 8 rises above the normal configuration datum position, as occurs when the static loading of the vehicle is decreased, then actuating arm 41 moves rotary valve element 94 to a position wherein valve port 97 communicates with exhaust valve passage 92. This releases air from air chambers 12 and 15 to atmosphere via fittings 76, line 16, line 18, bore 96 in rotary valve element 94, valve port 97, exhaust valve passage 92, and longitudinal passage 32 of a time delay exhaust restrictor means indicated generally at 30.

It will be understood that control valve 40 continues to exhaust air from air chambers 12 and 15 of the shock absorber apparatus 6 until the sprung weight portion 8 has moved back down to the normal configuration datum position.

Referring particularly to time delay exhaust restrictor means 30 it should be stated that this mechanism serves two important functions in the system as follows:

First, restrictor means 30 includes a time restrictor 100 preferably provided by an orifice means formed in the end of housing 91 that is "tuned" with respect to the oscillatory flow rate through rotary valve element 94 to provide a controlled exhaust flow rate from the air chamber means. Such controlled exhaust rate is established by the size of said restrictor 100 such that road imposed oscillations of the height control valve means for minute time intervals will never exhaust air from the air chamber means at a flow rate greater than the flow admitted by oscillatory action of rotary valve element 94. This prevents an undesirable "pumping down" of the air chamber means under sustained road imposed oscillations and eliminates the need for a manual shut-off valve for the exhaust flow from the height control valve means.

At the same time the size of restrictor means 100 must be large enough to provide a sufficient exhaust flow rate to prevent undesirable "pumping up" of the air chamber means during oscillatory conditions. It therefore follows that the size of restrictor means 100 is tuned to establish an exhaust flow rate substantially equal to the flow rate through rotary valve element 94 during oscillatory conditions.

Under decreases in static loading of the vehicle for sustained time intervals, the controlled exhaust flow capacity is great enough to promptly make the required height control correction required for the decreased load condition.

In the typical system disclosed herein it has been calculated and determined that a proper area for time delay exhaust restrictor means 100 is twenty-five thousands (.025) of an inch where the compressor 25 includes driving and driven piston means the size of which are established as discussed in detail later herein and where the average manifold pressure is twenty inches of mercury during normal cruise and idle conditions.

It should be pointed out that tuned control can be achieved in an alternate way other than establishing the size of restrictor 100 to provide the required exhaust flow rate without departing from the spirit of the present invention. Instead, the size of passage means 34 leading to the annular groove 36 can be established to provide an exhaust flow rate in proportion to the oscillatory flow rate through rotary valve element 94 as described in detail previously herein. In such alternate arrangement the opening at 100 must of course be larger than the tuned size of passage 34 such that passage 34 becomes the controlling restrictor means. In fact when control is achieved at passage 34 the entire housing wall of the exhaust restrictor means 30 can be eliminated without effecting the operation.

As a second important function, the above described time delay exhaust restrictor means 30 is uniquely adapted to accurately maintain extremely low minimum air pressure values and is very important in preventing the pressure in air chamber means 12 and 15 from ever falling below a predetermined minimum low pressure value, for example 10 p.s.i. This prevents collapsing of the air chamber means and thereby eliminates frictional wear and chaffing of the chamber walls.

Such maintenance of a low minimum pressure is accomplished in a novel manner by two contiguous O-ring valve elements 77 and 78 which are mounted in slightly stretched configuration in an annular groove 36. Radial passage means 34 connect annular groove 32 with longitudinal valve passage 32.

The bottom surface of annular groove 36 is preferably inclined upwardly and outwardly in both directions from the center whereby the O-ring valve elements are constantly biased towards said contiguous relationship.

It will now be understood that when the vehicle is lightly loaded and the pressure in air chamber means 12 and 15 drops then O-ring valve elements 77 and 78 will separate and thereby exhaust air only until the system pressure drops to said predetermined minimum established by the dimensions and configuration of annular groove 32 and O-ring valve elements 77 and 78. A relationship between the area $A_1$ of driving compressor piston means 52 and the area $A_2$ of driving compressor piston means 57 in accordance with the following "Direct Regulation Equation":

$$P_{MAX} = \frac{A_1}{A_2}(P_{AA} - P_{MA})$$

where:

$P_{MAX}$=The predetermined maximum static pressure in the air chamber means
$A_1$=Area of the driving piston means of the compressor
$A_2$=Area of the driven piston means of the compressor
$P_{AA}$=Average atmospheric pressure
$P_{MA}$=Average pressure in the engine intake manifold at normal cruising and idling speeds The above equation is developed by equating the predetermined maximum pressure $P_{MAX}$ in the air spring means to the stalling pressure $P_S$ of the compressor 25 such that (1) $\qquad P_{MAX} = P_S$ Now in order to satisfy equilibrium conditions in the compressor the following must be true:

(2) $\qquad P_S \times A_2 = A_1(P_A - P_M)$ where:

$P_S$=The stalling pressure of the compressor
$P_A$=The existing atmospheric pressure
$P_M$=The existing pressure in the engine intake manifold Transposing $A_2$ (3) $\qquad P_S = \frac{A_1}{A_2}(P_A - P_M)$ Substituting Equation 3 in Equation 1

(4) $\qquad P_{MAX} = \frac{A_1}{A_2}(P_A - P_M)$

Then $P_{MAX}$ during cruising and idling conditions can be determined by substituting in Equation 4 the average atmospheric pressure $P_{AA}$ and average intake manifold pressure $P_{MA}$ for the existing pressure values $P_A$ and $P_M$ as follows:

(5) $\qquad P_{MAX} = \frac{A_1}{A_2}(P_{AA} - P_{MA})$

It should be mentioned that $P_{MAX}$ during cruising and idling conditions represents the maximum static pressure produced in the air spring chambers during approximately ninety-seven percent or more of the vehicle operation. Under very unusual operating circumstances, for example where maximum engine deceleration is applied for an extended period of time, the actual static pressure in the air spring chambers will temporarily reach pressure values above the $P_{MAX}$ defined by the above equation for the reason that the engine manifold pressure will drop to an unusual low value that is less than the average. For example, pressures above $P_{MAX}$ can occur if the vehicle is descending on a long steep mountain road with maximum deceleration for an extended time interval. After the vehicle has negotiated the hill, however, and normal cruise and idle conditions are resumed, the system will automatically resume operating pressures not in excess of the predetermined $P_{MAX}$ defined by the above Equation 5.

The manifold pressure in the typical motor vehicle varies between the extremes of zero and approximately twenty-six inches of mercury, from full acceleration to full deceleration. However, at cruise and idle which represents about ninety-seven percent of the typical operation, the intake manifold pressure averages approximately twenty inches of mercury or approximately two-thirds of an atmosphere. This produces a positive pressure within the manifold of approximately one-third of an atmosphere or approximately five pounds per square inch absolute (p.s.i.a.). Since the average atmospheric pressure for sea level operation is 14.7 p.s.i.a. the effective working pressure differential available for pressurizing compressor diaphragm 52 is the difference between these pressure values of approximately 10 p.s.i.a.

For a typical system, then, Equation 4 above can be simplified as follows.

(6) $\qquad P_{MAX} = 10\frac{A_1}{A_2}$

For a passenger vehicle a typical maximum predetermined static pressure $P_{MAX}$ in the air spring chambers 12 and 15 of a controlled shock absorber would be 105 p.s.i.a. so substituting this in Equation 6 the required relationship between the areas of the driven and driving pistons of the compressor would be (7) $\qquad \frac{A_1}{A_2} = \frac{105}{10} = \frac{10.5}{1}$ In any static leveling system an acceptable maximum time for making a leveling correction under a maximum increase in statis loading is, for example, ninety seconds. If a high pressure reservoir is to be eliminated, as in the system of the present invention, it is necessary that the compressor delivery rate be sufficient to in 90 seconds supply the air volume requirements to build up the pressure in air spring chambers 12 and 15 to the predetermined maximum static pressure $P_{MAX}$ which is 105 p.s.i.a. in the present typical system. Tests have shown that a diameter of one inch for the driven piston means 57 of the compressor will provide an adequate compressor delivery rate for small atmospherically driven compressors of the present type when actuated by the above mentioned typical manifold pressure of twenty inches of mercury.

If the diameter of driven piston means 57 is established at one inch then the area $A_2$ will be approximately .785 of a square inch so the area $A_1$ of driving piston means 52 is determined as follows from Equation 7:

$$A_1 = A_2 \times 10.5$$
$$= .785 \times 10.5$$
$$= 8.24 \text{ sq. inches}$$

In summary it will now be understood that if the area $A_1$ of the driving piston means 52 is established at approximately 8.24 square inches the compressor will be directly controlled to stall at the predetermined maximum static pressure of 105 p.s.i.a. selected for the typical example discussed above.

It will be understood, in view of the above calculations, that the values set forth are by way of example for a controlled shock absorber system where the predetermined maximum pressure in the air spring chambers is 105 p.s.i.a. and the manifold pressure in the vehicle engine is approximately twenty inches of mercury at average engine speeds. Obviously the system can be applied to various system loads and pressures without departing from the spirit of the present invention.

While the form of embodiment of the present invention as herein disclosed constitute a preferred form, it is to be understood that other forms might be adopted, all coming within the scope of the claims which follow:

We claim:

1. A control system for vehicle suspensions of the type that include sprung and unsprung weight portions comprising, in combination, variable shock absorber apparatus operative between said sprung and unsprung weights and including air chamber means; an air compressor including a compressor outlet for delivering a flow of pressurized air to said air chamber means; resilient driving means for said compressor, said compressor being stallable against said resilient driving means whereby the pressure developed in said air chamber means does not exceed a predetermined maximum static pressure selected for said air chamber means; flow control valve means between said compressor outlet and said air chamber means for controlling said flow of pressurized air, said valve means including a pivoted actuating arm and inlet and outlet passages; and time delay exhaust restrictor means for said outlet passage, the flow rate through said restrictor means being proportioned to the flow rate through said valve inlet passage during road imposed oscillations of said valve means.

2. The control system defined in claim 1 wherein said control valve means includes a movable flow control element that terminates said flow of pressurized air from said compressor outlet to said air chamber means and thereby stalls said compressor responsive to a predetermined height differential between said sprung and unsprung weights.

3. A control system for vehicle suspensions of the type that include sprung and unsprung weight portions comprising, in combination, an engine including an intake manifold; variable shock absorber apparatus operative between said sprung and unsprung weights and including air chamber means; an air compressor driven by a flow of atmospheric air to said intake manifold and including a driven piston means, a driving piston means and a compressor outlet for delivering a flow of pressurized air to said air chamber means, said air compressor being stallable against the pressure of said flow of atmospheric air when the static pressure in said air chamber means reaches a predetermined maximum static pressure determined by the following equation:

$$P_{MAX} = \frac{A_1}{A_2}(P_A - P_M)$$

where:

$P_{MAX}$=The predetermined maximum static pressure in the air chamber means
$A_1$=Area of the driving piston means of the compressor
$A_2$=Area of the driven piston means of the compressor
$P_A$=Atmospheric pressure
$P_M$=Pressure in the engine intake manifold a flow control valve means between said compressor outlet and said air chamber means for controlling said flow of pressurized air; and a pivoted actuating arm for said valve means.

4. The control system defined in claim 3 wherein said control valve means includes a movable flow control element that terminates said flow of pressurized air from said compressor outlet to said air chamber means and thereby stalls said compressor responsive to a predetermined height differential between said sprung and unsprung weights.

5. A control system for vehicle suspensions of the type that include sprung and unsprung weight portions comprising in combination, air chamber means operative between said sprung and unsprung weights, an air compressor including a compressor outlet for delivering a flow of pressurized air to said air chamber means, resilient driving means for said compressor, said compressor being stallable against said resilient driving means whereby the pressure developed in said air chamber means does not exceed a predetermined maximum static pressure selected for said air chamber means; and valve means including a valve housing mounted on one of said sprung and unsprung weights, a valve inlet passage communicating with said compressor, a valve outlet passage for releasing air from said system, and a third valve passage communicating with said chamber; a movable valve element in said valve housing and movable between an "open" position for starting said air compressor and a "closed" position for stalling said air compressor; a pivoted valve actuating arm connecting said movable valve element to the other of said sprung and unsprung weights; and time delay restrictor means for said outlet passage, the flow rate through said restrictor means being proportioned to the flow rate through said valve inlet passage during road imposed oscillations of said valve means.

6. A control system for vehicle suspensions of the type that include sprung and unsprung weight portions comprising, in combination, an engine including an intake manifold; air chamber means operative between said sprung and unsprung weights; an air compressor driven by a flow of atmospheric air to said intake manifold and including a driving piston means a driven piston means and a compressor outlet for delivering a flow of pressurized air to said air chamber means, said air compressor being stallable against the pressure of said flow of atmospheric air when the static pressure in said air chamber means reaches a predetermined maximum static pressure determined by the following equation:

$$P_{MAX} = \frac{A_1}{A_2}(P_A - P_M)$$

where:

$P_{MAX}$=The predetermined maximum static pressure in the air chamber means
$A_1$=Area of the driving piston means of the compressor
$A_2$=Area of the driven piston means of the compressor
$P_A$=Atmospheric pressure
$P_M$=Pressure in the engine intake manifold and valve means including a valve housing mounted on one of said sprung and unsprung weights, a valve inlet passage communicating with said air compressor, a valve outlet passage for releasing air from said system, and a third valve passage communicating with said chamber; a movable valve element in said valve housing and movable between an "open" position for starting said air compressor and a "closed" position for stalling said air compressor; and a pivoted valve actuating arm connecting said movable valve element to the other of said sprung and unsprung weights.

7. A control system for vehicle suspensions of the type that include sprung and unsprung weight portions comprising, in combination, variable shock absorber apparatus operative between said sprung and unsprung weights and including air chamber means; an air compressor including a compressor outlet for delivering a flow of pressurized air to said air chamber means; resilient driving means for said compressor, said compressor being stallable against said resilient driving means whereby the pressure developed in said air chamber means does not exceed a predetermined maximum static pressure value selected for said air chamber means; valve means including a valve housing mounted on one of said sprung and unsprung weights, a valve inlet passage communicating with said compressor, a valve outlet passage for releasing air from said system, and a third valve passage communicating with said chamber; a movable valve element in said valve housing and movable between an "open" position for starting said air compressor and a "closed" position for stalling said air compressor; a pivoted valve actuating arm connecting said movable valve element to the other of said sprung and unsprung weights; and time delay restrictor means for said outlet passage, the flow rate through said restrictor means being proportioned to the flow rate through said inlet during road imposed oscillations of said valve means.

8. A control system for vehicle suspensions of the type that include sprung and unsprung weight portions comprising, in combination, an engine including an intake manifold; variable shock absorber apparatus operative between said sprung and unsprung weights and including air chamber means; an air compressor driven by a flow of atmospheric air to said intake manifold and including a driven piston means, a driving piston means and a compressor outlet for delivering a flow of pressurized air to said air chamber means, said air compressor being stallable against the pressure of said flow of atmospheric air when the static pressure in said air chamber means reaches a predetermined maximum static pressure determined by the following quotation:

$$P_{MAX} = \frac{A_1}{A_2}(P_A - P_M)$$

where:

$P_{MAX}$=The predetermined maximum static pressure in the air chamber means
$A_1$=Area of the driving piston means of the compressor
$A_2$=Area of the driven piston means of the compressor
$P_A$=Atmospheric pressure
$P_M$=Pressure in the engine intake manifold and valve means including a valve housing mounted on one of said sprung or unsprung weights, a valve inlet passage communicating with said air compressor means, a valve outlet passage for releasing air from said system, and a third valve passage communicating with said chamber; a movable valve element in said valve housing and movable between an "open" position for starting said air compressor means and a "closed" position of stalling said air compressor means; and a pivoted valve actuating arm connecting said movable valve element to the other of said sprung and unsprung weights.

9. In a vehicle suspension of the type that includes sprung and unsprung weights and variable shock absorber apparatus including air chamber means operative between said weights, the method of controlling the predetermined maximum static pressure in said air chamber means by supplying air to said air chamber means from an air compressor driven by a resilient means and including a compressor outlet; stalling said air compressor by flow control valve means for the flow of said air, said valve means including a pivoted actuating arm responsive to the height differential between said sprung and unsprung weights; and automatically releasing air from said air chamber means during road imposed oscillations of said suspension at flow rates proportioned to flow rates admitted from said compressor.

10. In a vehicle suspension of the type that includes sprung and unsprung weights and variable shock absorber apparatus including air chamber means operative between said weights, the method of controlling the predetermined maximum static pressure in said air chamber means by supplying air to said air chamber means from an air compressor driven by a flow of atmospheric air and including a driving piston means and a driven piston means; and stalling said air compressor by height responsive flow control valve means between said compressor outlet and said air chamber means when the static pressure in said air chamber means reaches said predetermined maximum, said valve means including a pivoted actuating arm, the relationship between the areas of said driving and priven piston means being established by the following formula:

$$P_{MAX} = \frac{A_1}{A_2}(P_{AA} - P_{MA})$$

where:

$P_{MAX}$=The predetermined maximum static pressure in the air chamber means
$A_1$=Area of the driving piston means of the compressor
$A_2$=Area of the driven piston means of the compressor
$P_{AA}$=Average atmospheric pressure
$P_{MA}$=Average pressure in the engine intake manifold at normal cruising and idling speeds 11. In a vehicle suspension of the type that includes sprung and unsprung weights and variable shock absorber apparatus including air chamber means operative between said weights, the method of controlling the predetermined miximum static pressure in said air chamber means by supplying air to said air chamber means from an air compressor driven by a flow of atmospheric air and including a driving piston means, a driven piston means, and a compressor outlet, said compressor having an area relationship between said driivng and driven piston means established by the following formula:

$$P_{MAX} = \frac{A_1}{A_2}(P_{AA} - P_{MA})$$

where:

$P_{MAX}$=The predetermined maximum static pressure in the air chamber means
$A_1$=Area of the driving piston means of the compressor
$A_2$=Area of the driven piston means of the compressor
$P_{AA}$=Average atmospheric pressure
$P_{MA}$=Average pressure in the engine intake manifold at normal cruising and idling speeds and stalling said air compressor at various air chamber means pressures below sad predetermined maximum by height responsive flow control valve means between said compressor outlet and said air chamber means, said valve means including a pivoted actuating arm.

12. A control system for vehicle suspensions of the type that include sprung and unsprung weight portions comprising, in combination, variable shock absorber apparatus operative between said sprung and unsprung weights and including air chamber means; an air compressor inble against said resilient driving means whereby the pressurized air to said air chamber means; resilient driving means for said compressor, said compressor being stallable against said resilient driving means whereby the pressure developed in said air chamber means does not exceed a predetermined maximum static pressure selected for said air chamber means; flow control valve means between said compressor outlet and said air chamber means for controlling said flow of pressurized air, said flow control valve means including an outlet passage and a pivoted actuating arm; and a minimum pressure relief valve body portion, an annular groove in said body portion, a passage connecting said outlet passage with said annular groove, and two O-rings disposed in yieldable contiguous relationship in said annular groove.

13. The control system defined in claim 12 that includes time delay exhaust restrictor means for said outlet passage, the flow rate through said restrictor means being proportioned to the flow rate through said inlet during road imposed oscillations of said valve means.

14. A control system for vehicle suspensions of the type that include sprung and unsprung weight portions comprising, in combination, air chamber means operative between said sprung and unsprung weights, an air compressor including a compressor outlet for delivering a flow of pressurized air to said air chamber means; resilient driving means for said compressor, said compressor being stallable against said resilient driving means whereby the pressure developed in said air chamber means does not exceed a predetermined maximum static pressure selected for said air chamber means; valve means including a valve housing mounted on one of said sprung and unsprung weights, a valve inlet passage communicating with said air compressor, a valve outlet passage for releasing air from said system, a third valve passage communicating with said chamber; a movable valve element in said valve housing and movable between an "open" position for starting said air compressor and a "closed" position for stalling said air compressor; and a pivoted valve actuating arm connecting said movable valve element to the other of said sprung and unsprung weights; a minimum pressure relief valve means for said outlet passage and comprising a relief valve body portion, an annular groove in said body portion, a passage connecting said outlet passage with said annular groove, and two O-rings disposed in yieldable contiguous relationship in said annular groove.

15. The control system defined in claim 14 that includes time delay exhaust restrictor means for said outlet passage; and time delay restrictor means for said outlet passage, the flow rate through said restrictor means being proportioned to the flow rate through said inlet during road imposed oscillations of said valve means.

16. The system of claim 1 that includes a minimum pressure relief valve means for said outlet passage and comprising a relief valve body portion, an annular groove in said body portion, a passage connecting said outlet passage with said annular groove, and two O-rings disposed in yieldable contiguous relationship in said annular groove.

17. The height control valve defined in claim 16 that includes a time delay exhaust restrictor means for said outlet passage.

18. A control system for vehicle suspensions of the type that include sprung and unsprung weights comprising, in combination, height control valve means operative between said weights and including an inlet passage, an outlet passage, and a third passage; a pivoted actuating arm for said valve means; a movable valve element for connecting said third passage with either said inlet passage or said outlet passage; and time delay restrictor means for said outlet passage, the exhaust flow rate through said restrictor means being proportioned to the flow rate through said valve inlet passage during road imposed oscillations of said movable valve element.

References Cited

UNITED STATES PATENTS 3,215,339 11/1965 Jackson _____ 230—52
3,038,739 6/1962 Vogel.
3,002,765 10/1961 MacDuff.

PHILIP GOODMAN, Primary Examiner

U.S. Cl. X.R.

280—6.1